(12) United States Patent
Jensen et al.

(10) Patent No.: US 11,996,737 B2
(45) Date of Patent: May 28, 2024

(54) SUPPORT STRUCTURE FOR A GENERATOR OF A WIND TURBINE

(71) Applicant: Siemens Gamesa Renewable Energy A/S, Brande (DK)

(72) Inventors: Kim Robert Braun Jensen, Silkeborg (DK); Simon Vyff Jensen, Tørring (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 0 days.

(21) Appl. No.: 17/767,939

(22) PCT Filed: Oct. 5, 2020

(86) PCT No.: PCT/EP2020/077788
§ 371 (c)(1),
(2) Date: Apr. 11, 2022

(87) PCT Pub. No.: WO2021/073912
PCT Pub. Date: Apr. 22, 2021

(65) Prior Publication Data
US 2024/0106286 A1 Mar. 28, 2024

(30) Foreign Application Priority Data

Oct. 18, 2019 (EP) .................................. 19204064

(51) Int. Cl.
*H02K 1/18* (2006.01)
*F03D 13/20* (2016.01)
(Continued)

(52) U.S. Cl.
CPC ........... *H02K 1/187* (2013.01); *F03D 13/201* (2023.08); *H02K 1/20* (2013.01); *H02K 7/1838* (2013.01);
(Continued)

(58) Field of Classification Search
CPC ........ H02K 1/187; H02K 1/20; H02K 7/1838; F03D 13/201; F05B 2240/912
See application file for complete search history.

(56) References Cited

U.S. PATENT DOCUMENTS 3,462,624 A 8/1969 Darrieus
4,425,523 A 1/1984 Detinko et al.
(Continued)

FOREIGN PATENT DOCUMENTS

CN 1998123 B 6/2012
DE 10 2017 206873 A1 10/2018
(Continued)

OTHER PUBLICATIONS

International Search Report & Written Opinion for PCT/EP2020/077788 dated Nov. 17, 2020.

*Primary Examiner* — Sean Gugger
(74) *Attorney, Agent, or Firm* — Schmeiser, Olsen & Watts, LLP

(57) ABSTRACT

A support structure for a stator of a generator, in particular of a wind turbine is provided, wherein the support structure of a wind turbine is provided, wherein the support structure includes a carrier element extending in an axial direction, wherein the carrier element includes a base section, a side section and a top section and wherein the base section of at least one carrier element of the plurality of carrier elements is connected to the base section of another one carrier element of the plurality of carrier elements. A plurality of circumferential connecting elements circumferentially protruding from the base section of one carrier element is connected to another plurality of connecting elements circumferentially protruding from the base section of another carrier element in order to provide a connection between the one and the other carrier element, a plurality of cooling pockets being formed between the connecting elements for cooling air to pass.

13 Claims, 4 Drawing Sheets

(51) Int. Cl.
*H02K 1/20* (2006.01)
*H02K 7/18* (2006.01)

(52) U.S. Cl.
CPC ... *F05B 2220/706* (2013.01); *F05B 2240/912* (2013.01)

(56) References Cited

U.S. PATENT DOCUMENTS

| | | |
|---|---|---|
| 2002/0074884 A1 | 6/2002 | Fuller |
| 2012/0074798 A1 | 3/2012 | Bywaters et al. |
| 2012/0098268 A1 | 4/2012 | Gelmini |
| 2012/0133145 A1 | 5/2012 | Longtin et al. |
| 2015/0176571 A1 | 6/2015 | Bustreo et al. |
| 2015/0236553 A1* | 8/2015 | Pabst .................... H02K 1/185 310/216.126 |

FOREIGN PATENT DOCUMENTS

| | | |
|---|---|---|
| EP | 2381560 A1 | 10/2011 |
| FR | 2528254 A1 | 12/1983 |
| GB | 2505472 A | 3/2014 |
| GB | 2505473 A | 3/2014 |
| GB | 2505479 A | 3/2014 |
| JP | S59 11752 A | 1/1984 |
| JP | 2001 119872 A | 4/2001 |
| WO | 2014016806 A2 | 1/2014 |
| WO | 2014/045247 A2 | 3/2014 |

\* cited by examiner

SUPPORT STRUCTURE FOR A GENERATOR OF A WIND TURBINE

CROSS-REFERENCE TO RELATED APPLICATIONS

This application claims priority to PCT Application No. PCT/EP2020/077788, having a filing date of Oct. 5, 2020, which claims priority to EP Application No. 19204064.0, having a filing date of Oct. 18, 2019, the entire contents both of which are hereby incorporated by reference.

FIELD OF TECHNOLOGY

The following relates to a support structure for a generator of a wind turbine and a generator of a wind turbine comprising such support structure. The support structure may a be a segmented support structure.

BACKGROUND

Wind turbines typically include multiple blades for generating mechanical rotation energy. A generator within the wind turbine is configured to generate electrical power as the blades are driven to rotate by the wind. Wind turbines are therefore designed to efficiently translate wind energy into rotational motion, thereby providing the generator with sufficient rotational energy for electrical power generation.

The generator of the wind turbine comprises a stator and a rotor.

The stator normally comprises a frame body longitudinally extending along a longitudinal axis and including a plurality of teeth protruding according to a radial direction from the stator yoke. In the stator a plurality of slots is also defined, each slot being delimited circumferentially by two adjacent teeth. Each slot houses a respective winding. Lamination sheets are attached one after another along the axial direction of the stator and form a lamination stack of the stator, where the coils for electrical power generation are provided. The rotor comprises a plurality of magnets. Upon rotation of the magnets, rotational energy is converted into electrical power.

There are designs, which have the rotor arranged radially outward with respect to the stator. In a different design the stator is arranged radially outward with respect to the rotor.

The segmented lamination sheet stacks of the stator need to be placed at a specified distance to the magnets of the rotor. To this end, a support structure is incorporated in the stator between the lamination sheet section of the stator and the rotor.

Such a support structure needs to provide versatile functions, to prevent collision between the stator and rotor, in particular regarding the significant radial and tangential electromagnetic (EM) forces which are generated within the active generator. Further, it should prevent the occurrence of coinciding eigenfrequencies of the segmented assembly and electromagnetic excitation force frequencies. Furthermore, the support structure needs to withstand all generator load conditions in the long term, i.e., during the whole lifetime of the generator and should enable efficient cooling by channeling of cooling air.

Support structures as part of a stator are known in the state of the art. The support structure may comprise a carrier element. The carrier element is employed for coupling the support structure segment, and therefore the support structure as a whole, to the lamination sheet section of the stator. The carrier elements in such support structures known from the state of the art are T-profile type carrier elements. Such carrier elements have a base section, wherein at the centre of the base section a solid perpendicular element is placed. Alternatively, a net-plate, i.e., a plate which is welded and have cut-outs) may be used.

Due to a limited surface area of the centre element, coupling of the support structure to the lamination sheet section of the stator may result in limited stability connections. Such connections may not be sufficient to meet the stability requirements of modern wind turbines.

Further, conventional support structure may still be improved as far as radial stiffness is concerned. It may be desirable, for example, to provide the required level of radial stiffness with less material or with a more simplified design.

SUMMARY

An aspect relates to a support structure for a stator, in particular for use in a generator of a wind turbine, which fulfils the requirements regarding mechanical stability and which at the same time can be manufactured in a cost-efficient way.

One aspect of embodiments of the invention relates to a support structure for a stator of a generator, in particular of a wind turbine, wherein the support structure extends along a longitudinal axis and comprises a plurality of carrier elements, each carrier element comprising a base section, a side section and a top section. The base section and the side section are oriented relative to each other at an outer angle ($\phi$) in a range of 70° to 130°. The side section and the top section are oriented relative to each other at an inner angle ($\theta$) in a range of 70° to 130°. The base section is connected to the side section. The side section is connected to the top section. The base section is spaced apart from the top section essentially in a radial direction orthogonal to the longitudinal axis. The base section of at least one carrier element of the plurality of carrier elements is connected to the base section of another one carrier element of the plurality of carrier elements. A plurality of circumferential connecting elements circumferentially protruding from the base section of one carrier element is connected to another plurality of connecting elements circumferentially protruding from the base section of another carrier element 200 in order to provide a connection between the one and the other carrier element, a plurality of cooling pockets being formed between the connecting elements for cooling air to pass.

Embodiments of the present invention provide high radial stiffness. At the same time less pre-machining of support elements is required, with respect to the conventional art. Further, less circumferential ribs and less welding are also required, thus reducing costs for material and labor. Potential better cooling is achieved as less tangential ribs reduces the pressure drop. The carrier elements do not only allow for a stable connection of the support structure segment to the lamination structure but in addition allow for establishing a connection in the circumferential direction to other circumferentially adjacent carrier elements.

The base section, the side section and the top section of the carrier element describe for example a Z-type profile. In an embodiment as described further below, the base section, the side section, the top section, a further side section, and a further base section of the carrier element describe an Ω-type profile (omega type profile).

Thereby, the carrier element or a plurality of carrier elements form the support structure segment. One or a plurality of lamination sheets of the stator can be coupled to the support structure segment, and therefore the support structure as a whole forms a lamination sheet section of the stator.

The support structure segment is used with a generator design, in which the stator is arranged radially outward with respect to the rotor but is not restricted thereto. The support structure segment may also be used in a generator design which has the rotor arranged radially outward with respect to the stator.

According to embodiments of the present invention, the outer angle φ may be in a range of approximately 850 to approximately 1200 and more in particular in a range of approximately 85° to approximately 105°. Further, the inner angle θ may be in a range of approximately 850 to approximately 1200 and more in particular in a range of approximately 850 to approximately 105°. The inner angle θ and the outer angle φ may take approximately the same value.

The base section essentially extends in the circumferential direction connecting directly to the side section. The side section essentially extends in radial direction. An end of the side section is therefore oriented essentially in radial direction. In this context, the term "essentially extends in radial direction" means that the side section extends in radial direction within the boundaries expressed by the outer angle.

The side section connects directly to the top section. The top section essentially extends in circumferential direction. The ends of the top section are therefore oriented essentially in circumferential direction. In this context, the term "essentially extends in circumferential direction" means that the top section extends in circumferential direction within the boundaries expressed by the inner angle. The base section, the side section and the top section form a Z-type profile when viewed along the axial direction.

The support structure comprises one or a plurality of the above-described carrier elements. The carrier elements are arranged spaced apart from each other along the circumferential direction and extend generally along the axial direction. Specifically, a carrier element comprises the above-described top section, base section and side section. The top section is arranged within a top plane, the base section is arranged within a base plane and the side section is arranged within the side plane. The top section, the base section and the side section extends parallel with respect to each other along a longitudinal direction, for example along the axial direction. The top plane and the side plane (i.e., their normal) have the inner angle between each other of approximately 70° to approximately 130°, in particular 90°. The base plane and the side plane (i.e., their normal) have an outer angle between each other of approximately 70° to approximately 130°, in particular 90°.

According to embodiments of the present invention, each cooling pocket extends along the longitudinal axis between two connections, each connection being performed by joining two connecting elements of two respective circumferentially adjacent carrier elements.

According to an embodiment, the carrier element is a monolithically formed carrier element, in particular a monolithically formed metal carrier element.

The manufacture of a monolithically formed carrier element is cost efficient and allows for easy adaptation of the size and measures of the carrier elements to the size and measures of the generator which it is provided for. Therefore, scaling of the support structure, i.e., adjusting the support structure to generators of different sizes and measure is efficiently possible.

According to an embodiment, the support structure comprises at least two carrier elements.

The support structure segment comprises at least 3, 4, 5, 6 or 7 or even more carrier elements.

By providing a plurality of carrier elements a stable coupling of the support structure to the lamination sheet section may be achieved. Further, the individual carrier elements of the plurality of separate carrier elements may be spaced apart and openings may be formed between two adjacent carrier elements which allow for a flow of air in a radial direction.

The aspects defined above and further aspects of embodiments of the present invention are apparent from the examples of embodiment to be described hereinafter and are explained with reference to the examples of embodiment. The following will be described in more detail hereinafter with reference to examples of embodiment but to which embodiments of the invention is not limited.

BRIEF DESCRIPTION

Some of the embodiments will be described in detail, with reference to the following figures, wherein like designations denote like members, wherein.

DETAILED DESCRIPTION

Figure 1:
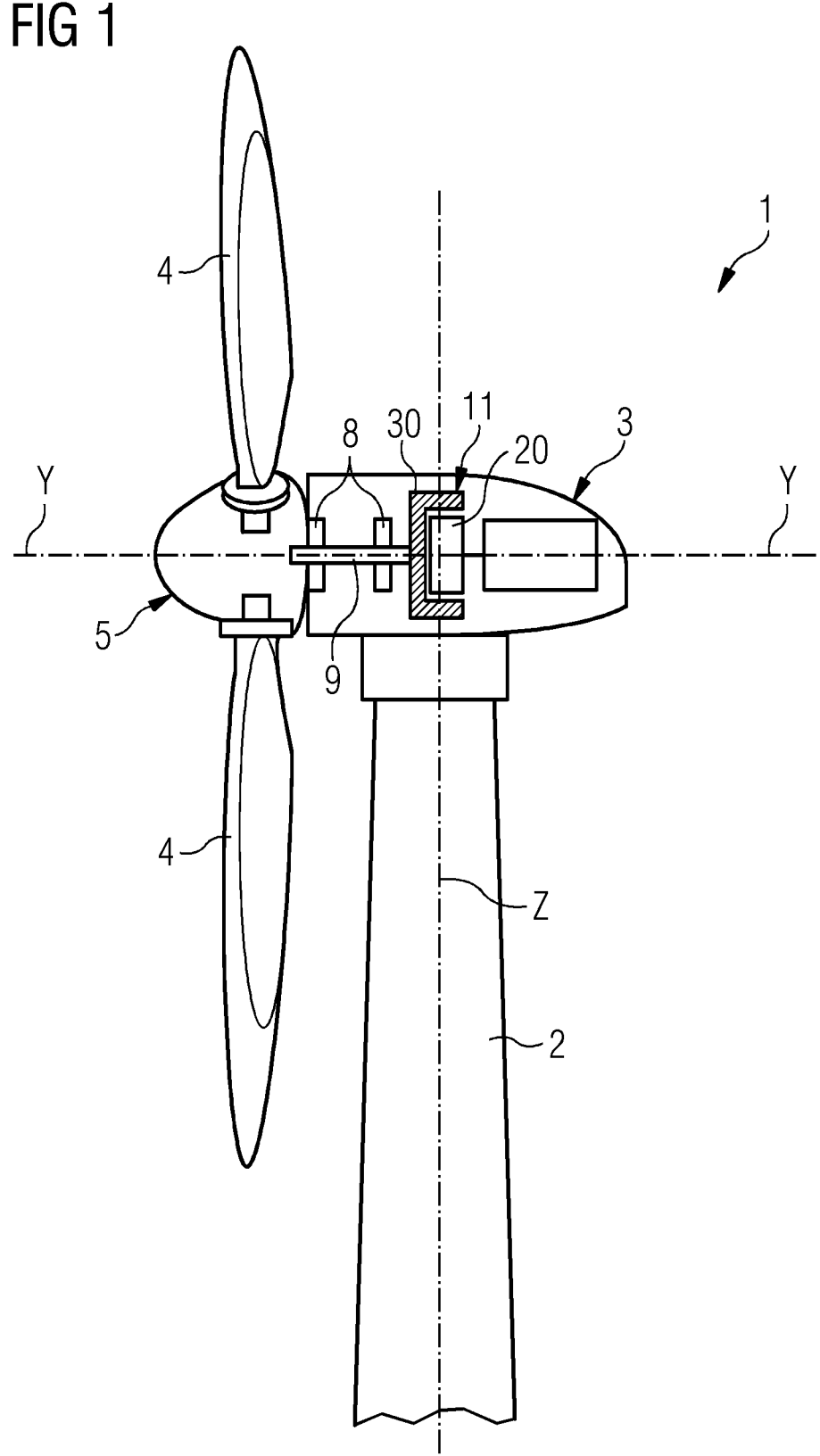
FIG. 1 shows a schematic section of a wind turbine including an electrical generator with a stator according to embodiments of the present invention.

FIG. 1 shows a wind turbine 1 according to embodiments of the invention. The wind turbine 1 comprises a tower 2, which is mounted on a non-depicted foundation. A nacelle 3 is arranged on top of the tower 2. The wind turbine 1 further comprises at least a wind rotor 5 having a hub and at least one blade 4 (in the embodiment of FIG. 1, the wind rotor comprises three blades 4, of which only two blades 4 are visible). The wind rotor 5 is rotatable around a rotational longitudinal axis Y. The blades 4 extend substantially radially with respect to the longitudinal axis Y. In general, when not differently specified, the terms axial, radial and circumferential in the following are made with reference to the rotational longitudinal axis Y. The wind turbine 1 comprises at least one electric generator 11, including a stator 20 and a rotor 30. The rotor 30 is rotatable with respect to the stator 20 about the rotational longitudinal axis Y. The wind rotor 5 is coupled with the rotor 30 and both are connected to an outer ring of a main bearing assembly 8. The outer ring of the main bearing assembly 8 rotates about the rotational longitudinal axis Y with respect to a static inner ring, which is coupled with a main shaft 9 extending along the longitudinal axis Y.

Figure 2:
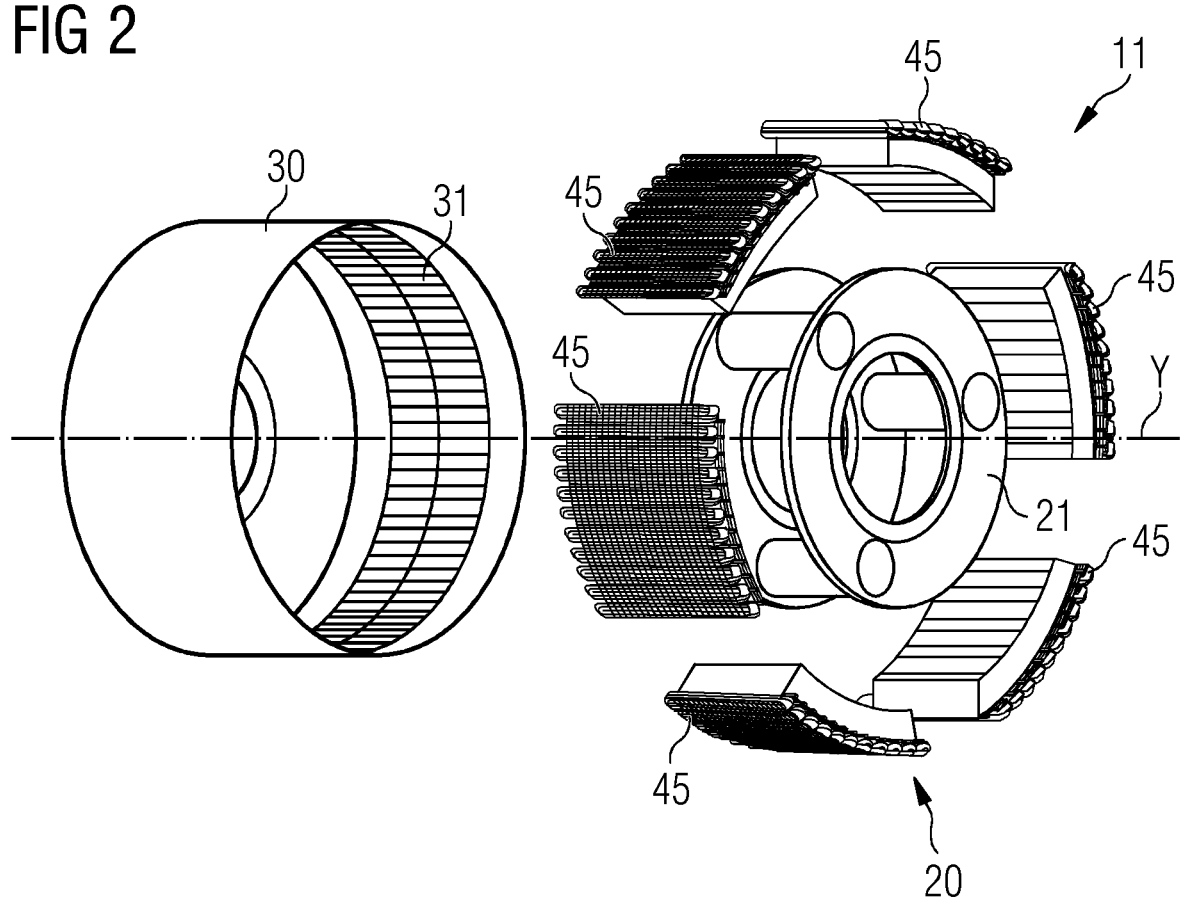
FIG. 2 shows an exploded view of an electrical generator with a stator according to embodiments of the present invention.

FIG. 2 shows an exploded view of the electrical generator 11 with the rotor 30 and the stator 20. The stator 20 comprises a cylindrical inner core 21 to which six segments 45 are attached. Each segment 45 has a circumferential angular extension of 60°. According to other embodiments of the present invention, the stator 20 comprises a plurality of segments having a number of segments different from six. According to another possible embodiment of the present invention, the stator 20 is not segmented, i.e., the stator includes one single segment covering the entire angular extension of 360°. The rotor 30 has a conventional structure with a plurality of circumferentially distributed rotor permanent magnets 31.

Figure 3:
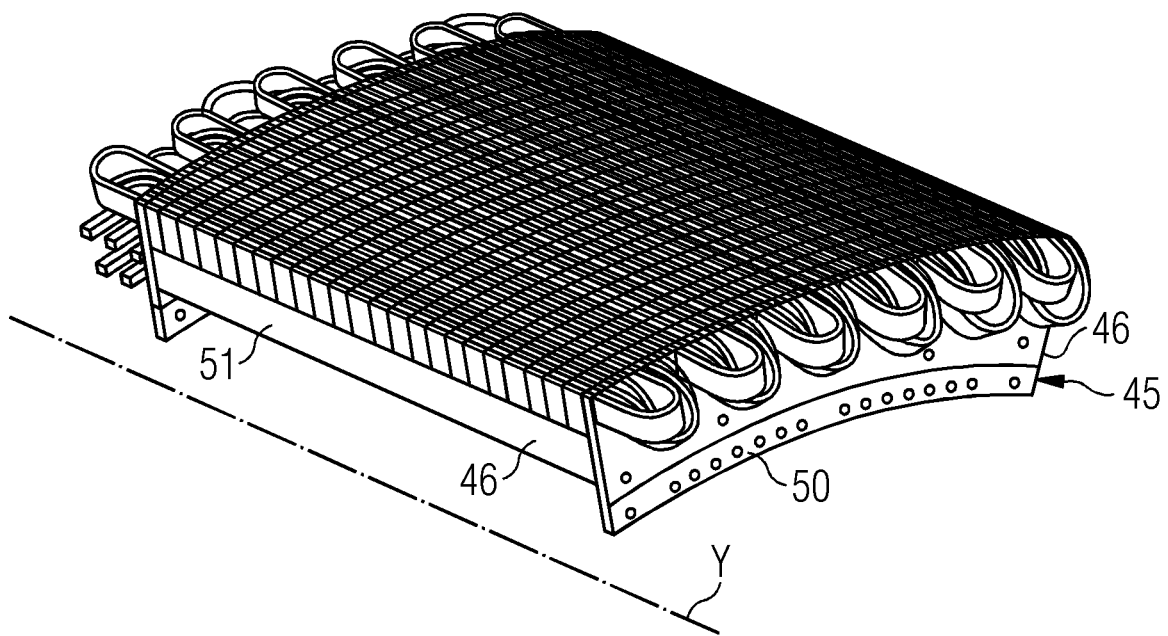
FIG. 3 shows an axonometric view of a segment of the stator of FIG. 2.
Figure 4:
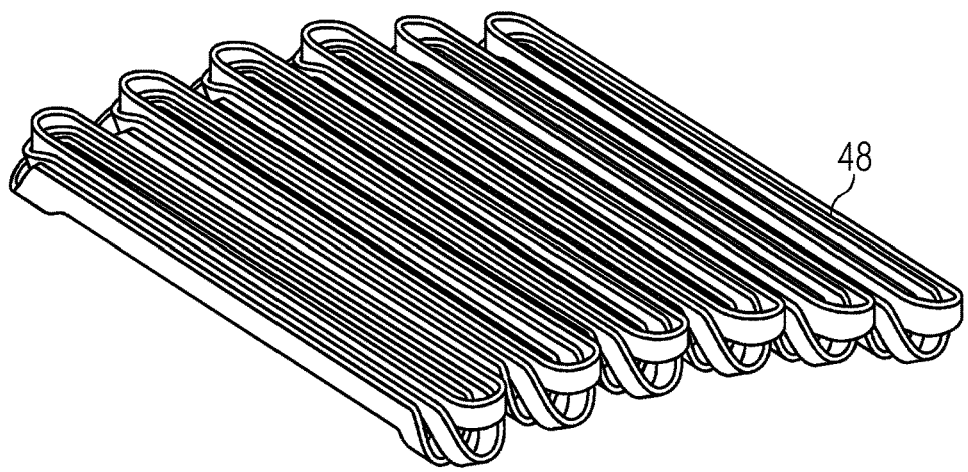
FIG. 4 shows a first component of the segment of FIG. 3.
Figure 5:
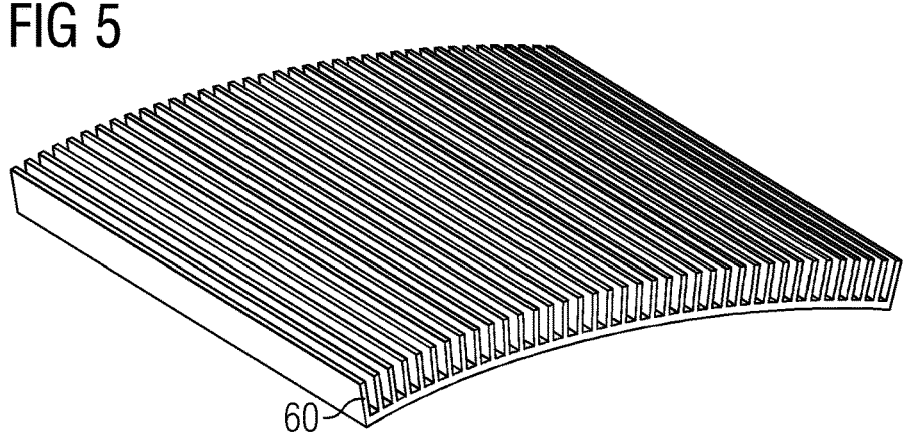
FIG. 5 shows a second component of the segment of FIG. 3.

FIGS. 3 to 5 show more in details a stator segment 45. The stator segment 45 has a conventional structure comprising a plurality of teeth circumferentially interposed between a plurality of slots. The teeth protrude according to the radial direction. The stator segment 45 further comprises coil windings 48 inserted in the slots of the segment 45. Teeth, slots and windings 48 are not a specific object of embodiments of the present invention and therefore not described in further details. Each segment 45 includes a support structure 50 and a lamination stack 60 supported by the support structure 50.

The support structure 50 circumferentially extends between two circumferential ends 46. At each circumferential end 46, a respective flat bar 51 is provided. The flat bar 51 may be used for joining together the plurality of segments 45, for example by a plurality of bolted connections or by welding. The lamination stack 60 comprises a plurality of lamination sheets which are attached one after another along the longitudinal axis Y of the stator 20. The lamination stack 60 is fixed to the support structure 50 as better specified in the following. When the stator segments 45 are circumferentially joined together, the assembly made by all the support structures 50 and the lamination stack 60 constitutes a stator body. According to the possible embodiment of the present invention where the stator 20 is not segmented, the stator body is made of a single support structure 50 and a single lamination stack 60, both covering the entire angular extension of 360°. In the latter embodiment the flat bars 51 are not present.

Figure 6:
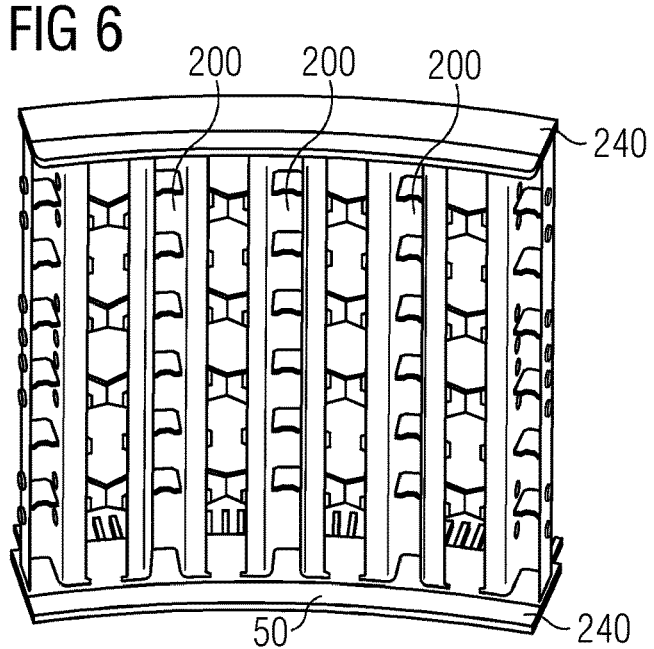
FIG. 6 shows a support structure for the segment of FIG. 3, in a first axonometric view from the bottom.
Figure 7:
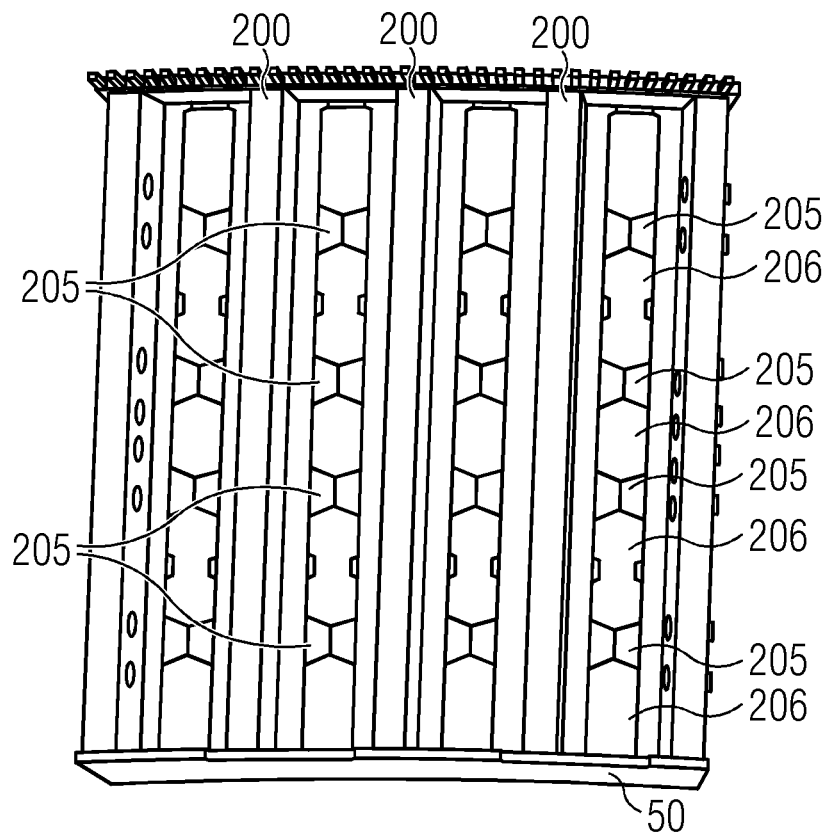
FIG. 7 shows a support structure for the segment of FIG. 3, in a second axonometric view from the top.

FIGS. 6 and 7 show a support structure 50 for a segment 45 according to an embodiment of the invention, in two perspective views from the bottom and the top, respectively. The support structure segment 50 is configured for use in a stator of a wind turbine. The support structure segment 50 comprises a plurality of carrier elements 200. Each carrier element 200 has a section having approximately the shape of the Greek letter "Omega" (Ω), such section being extended along longitudinal axis Y. The carrier element 200 is symmetrical with respect to a mirror plane, with the mirror plane passing midway through the carrier element 200 in such a way that the top section 203 is essentially perpendicular to the mirror plane and with the mirror plane being perpendicular to the circumferential direction.

The support structure segment 50 further comprises two pressure plates 240 at the two longitudinal ends of the support structure 50, respectively. Each of the two pressures plates 240 are fixed, for example by welding, to the inner core 21 of the stator 20. Each carrier element 200 extends longitudinally from one to the other of the two pressures plates 240.

Figure 8:
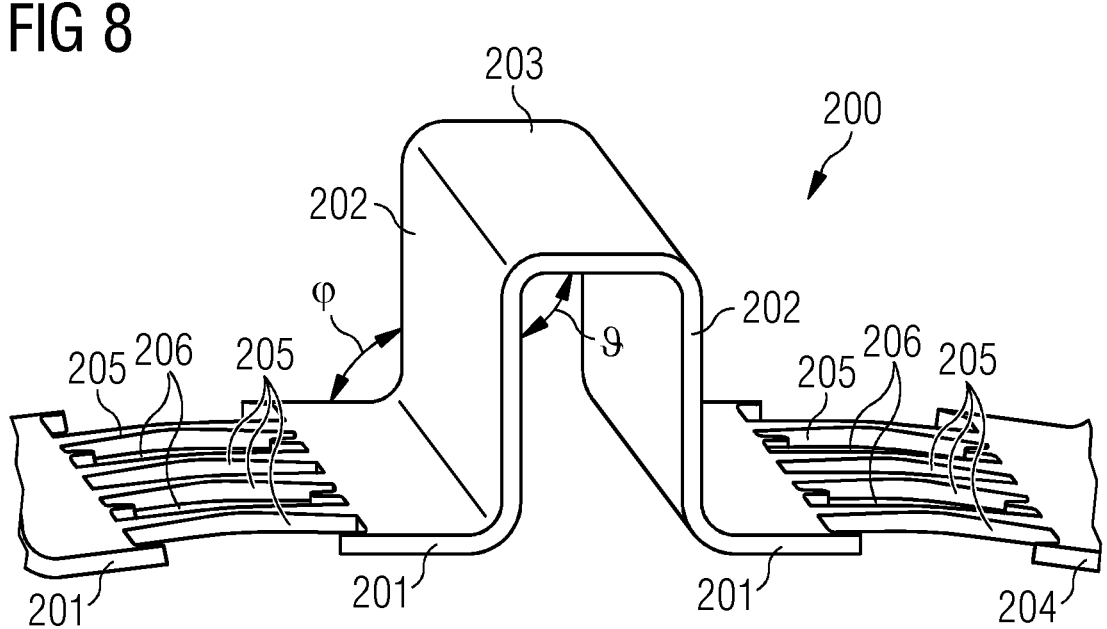
FIG. 8 shows a carrier element of the support structure according to an embodiment of the invention, in a perspective view.

FIG. 8 shows a plurality of carrier elements 200 of the support structure segment 50 according to an embodiment of the invention, in a perspective view. Each carrier element 200 comprises a first and a second base section 201, a first and a second side section 202 and a top section 203. The base section 201 and the top section 203 span circumferentially, while the side section span radially. Each base section 201 is connected to a respective side section 202, oriented relative to each other at an outer angle 4 having a value of approximately 90°. Each side section is connected to the top section 203. Each side section 202 forms with the top section 203 an inner angle θ having a value of approximately 90°. The base sections 201 are spaced apart from the top section 203 essentially in a radial direction. The first and the second side section are spaced apart from one another in the circumferential direction.

According to another embodiment of the present invention, at least one carrier element 200 comprises only one base section 201, in particular at the circumferential end section 51 (FIG. 3), which may be formed by one side section 202 of the carrier element 200. In such case, the carrier element 200 has a section having approximately the shape of the Latin letter "Z", such section being extended along longitudinal axis Y.

The top section 203 is configured to be coupled to the lamination stack 60. This connection is established by a fixing connection, for example by bolts. In order to establish such a fixing connection a bolt-hole may be provided in the top section 203. To this end, the top section 203 forms a plateau which has a suitably extended surface area to enable the formation of bolt-holes therein and to firmly secure a bolt in the bolt-hole.

The carrier element 200 may be a single-piece carrier element, in particular a monolithically formed carrier element of a metal or a metal alloy. The first base section 201, the first side section 202, the top section 203, the second side section 202 and the second base section 201 constitute the carrier element, in this order from one circumferential end to another circumferential end. At the transition interfaces between the sections the carrier element 200 forms rounded edges.

The base section 201 of at least one carrier element 200 of the plurality of carrier elements 200 is connected to the base section 201 of another one carrier element 200 of the plurality of carrier elements 200. Each connection may be performed for example by welding.

With reference to the embodiment of FIGS. 6 to 8, a plurality of connections (four connections shown in the figures) are established between each base section 201 of one carrier element 200 and the base section 201 of another circumferentially adjacent carrier element 200. The plurality of connections is distributed along the longitudinal axis Y, for example regularly distributed along the longitudinal axis Y, at constant distance between one connection and the following one. The connection is performed through a plurality of connecting elements 205 circumferentially protruding from one base section 201 of one carrier element 200 and connected, for example welded, to another plurality of connecting elements 205 circumferentially protruding from one base section 201 of another carrier element 200. Between the connecting elements 205 cooling pockets 206 are formed for cooling air to pass. Each cooling pocket 206 extends along the longitudinal axis Y between two connections, each connection being performed by joining two connecting elements 205 of two respective circumferentially adjacent carrier elements 200. According to other embodiments of the present invention (not shown), any number of connecting element may be provided between each base section 201 of one carrier element 200 and the base section 201 of another circumferentially adjacent carrier element 200, for example one connection or two or three connections or any number of connection greater of four. The number of cooling pockets 206 is determined consequently, for example five cooling pockets 206 are provided in the embodiment of the attached figures.

According to another embodiment of the present invention (not shown), at least one base section 201 of one carrier element 200 extends circumferentially up to the base section 201 of another circumferentially adjacent carrier element 200, the two base sections 201 of the two circumferentially adjacent carrier elements 200 being connected together, for example by welding. In such embodiment no cooling pocket 206 is present.

The connections between the carrier element 200 provides a plurality of circumferential stiffeners, so that additional circumferential stiffeners may not be requested in the support structure 50.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A support structure for a stator of a generator for a wind turbine, wherein the support structure extends along a longitudinal axis and comprises a plurality of carrier elements, each carrier element comprising a base section, a side section and a top section, wherein
   the base section and the side section are oriented relative to each other at an outer angle in a range of 70° to 130°,
   the side section and the top section are oriented relative to each other at an inner angle in a range of 70° to 130°,
   the base section is connected to the side section,
   the side section is connected to the top section,
   the base section is spaced apart from the top section essentially in a radial direction orthogonal to the longitudinal axis,
   wherein the base section of at least one carrier element of the plurality of carrier elements is connected to the base section of another one carrier element of the plurality of carrier elements
   wherein
   a plurality of circumferential connecting elements circumferentially protruding from the base section of one carrier element is connected to another plurality of connecting elements circumferentially protruding from the base section of another carrier element in order to provide a connection between the one and the other carrier element, a plurality of cooling pockets being formed between the connecting elements for cooling air to pass.

2. The support structure according to claim 1, wherein each cooling pocket extends along the longitudinal axis between two connections, each connection being performed by joining two connecting elements of two respective circumferentially adjacent carrier elements.

3. The support structure according to claim 1, wherein the base section of one carrier element of the plurality of carrier elements is connected to the base section of another one carrier element of the plurality of carrier elements by welding.

4. The support structure according to claim 1, wherein the carrier element is a monolithically formed carrier element, in particular a monolithically formed metal carrier element.

5. The support structure according to claim 4, wherein the carrier element is a monolithically formed metal carrier element.

6. The support structure according to claim 1, wherein the top section is configured to be coupled to a lamination sheet section of the stator by a fixing connection.

7. The support structure according to claim 1, wherein
   the carrier element comprises a first and a second side section being coupled to the top section and being spaced apart from one another in a circumferential direction about the longitudinal axis.

8. The support structure according to claim 7, wherein
   a circumferential end section of the support structure is formed by one side section of the carrier element.

9. The support structure according to claim 7, wherein the carrier element further comprises a first and a second base section being respectively coupled to the first and the second side section and being spaced apart from the top section in the radial direction.

10. A stator for a generator for a wind turbine, wherein the stator comprises:
    a lamination sheet stack, and
    at least one support structure according to claim 1.

11. The stator according to claim 10, wherein the stator has a circumferentially segmented structure including a plurality of support structure segments.

12. A generator for a wind turbine including a stator according to claim 10.

13. A wind turbine including the generator according to claim 12.

* * * * *